United States Patent [19]

Harada et al.

[11] Patent Number: 5,160,038

[45] Date of Patent: Nov. 3, 1992

[54] WATER PURIFYING APPARATUS

[75] Inventors: Takashi Harada; Susumu Fujimura; Masahide Higashiyama; Hidetoshi Tokita, all of Ichihara, Japan

[73] Assignee: Ube Industries, Ltd., Yamaguchi, Japan

[21] Appl. No.: 752,688

[22] PCT Filed: Jan. 11, 1990

[86] PCT No.: PCT/JP90/00024

§ 371 Date: Sep. 9, 1991

§ 102(e) Date: Sep. 9, 1991

[87] PCT Pub. No.: WO91/10622

PCT Pub. Date: Jul. 25, 1991

[30] Foreign Application Priority Data

Jun. 28, 1988 [JP] Japan .................................. 63-160199
Jun. 28, 1988 [JP] Japan .................................. 63-160200
Jun. 28, 1988 [JP] Japan .................................. 63-160201

[51] Int. Cl.⁵ ............................................ B01D 35/147
[52] U.S. Cl. .................................... 210/149; 210/266; 210/282
[58] Field of Search ................. 210/266, 282, 742, 149

[56] References Cited

U.S. PATENT DOCUMENTS

| | | | |
|---|---|---|---|
| 4,172,796 | 10/1979 | Corder | 210/282 |
| 4,271,015 | 6/1981 | Moore | 210/282 |
| 4,306,966 | 12/1981 | Lucia | 210/149 |
| 4,368,123 | 1/1983 | Stanley | 210/282 |
| 4,711,723 | 12/1987 | Bray | 210/266 |
| 4,828,698 | 5/1989 | Jewell et al. | 210/266 |
| 4,911,840 | 3/1990 | Underwood | 210/266 |
| 4,936,985 | 6/1990 | Hahn | 210/266 |
| 4,976,866 | 12/1990 | Grinstead | 210/266 |
| 5,071,551 | 12/1991 | Muramatsu | 210/266 |

FOREIGN PATENT DOCUMENTS

| | | |
|---|---|---|
| 60-220107 | 10/1985 | Japan . |
| 63-10858 | 3/1988 | Japan . |
| 63-107796 | 7/1988 | Japan . |
| 63-264187 | 11/1988 | Japan . |
| 1-4286 | 1/1989 | Japan . |
| 1143686 | 6/1989 | Japan . |

Primary Examiner—Stanley S. Silverman
Assistant Examiner—Cynthia L. Nessler
Attorney, Agent, or Firm—Young & Thompson

[57] ABSTRACT

A water purifying cartridge including a double structure container having an outer container and an inner cylinder disposed within the outer container, an inlet port for flowing water into an external space defined by the outer container and the inner cylinder, and an outlet port for discharging water from the internal space formed within the inner cylinder, the external space and the internal space communicating with each other through a water channel formed in the inner cylinder and separated by a filter, the external space being filled with activated carbon and the internal space being loaded with separation- and filtration membranes, whereby water flowed into the external space from the raw water supplying portion via the inlet port being arranged to pass through the activated carbon, then introduced into the internal space via the water channel, then purified during the passage through the separation- and filtration membranes, and then discharged from the purified water outlet portion via the outlet port.

6 Claims, 5 Drawing Sheets

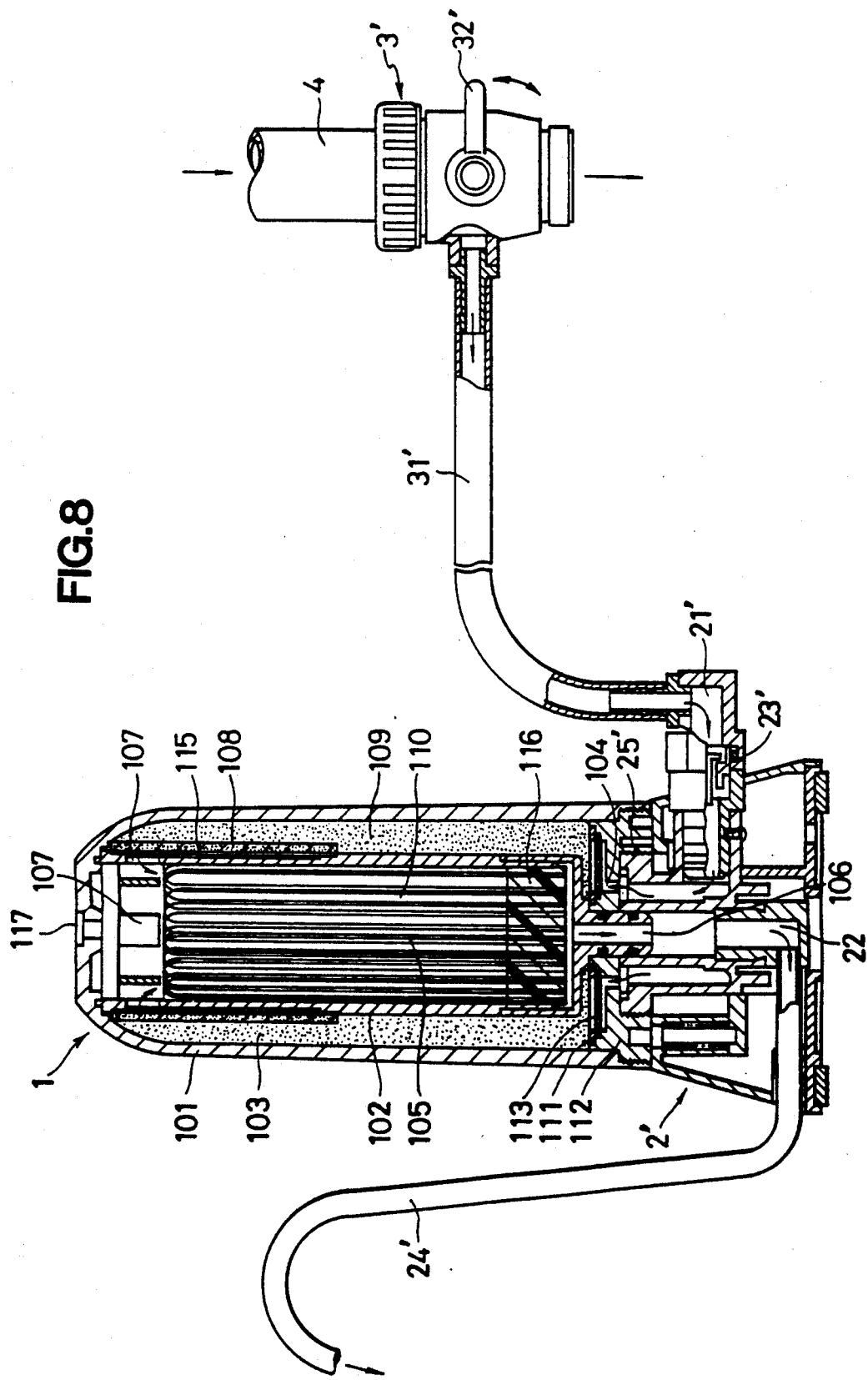

WATER PURIFYING APPARATUS

FIELD OF THE INVENTION

This invention relates to a novel water purifying cartridge, a water purifying apparatus using the water purifying cartridge, which is mounted on a cock of water pipe in order to purify raw water, and a water purifying apparatus including a mechanism for preventing the inflow of a hot water.

PRIOR ART

In recent years, pollution of service water, etc. caused by various kinds of organics and inorganics is becoming a serious problem. Many causes can be considered for it, such as for example, increased pollution of the source of public water supply, deterioration of water supply tanks and water piping which can be observed in tall houses, high-rise buildings, etc. Reflecting such situation, in order to obtain tasty and safe water, various kinds of small-sized water purifying apparatus are used in general at home, office, restaurant, etc., as handy service water processing devices.

The service water processing devices usually include a water processing material or materials such as activated carbon, ion exchange resin, separation- and filtration membranes, and owing to these service water processing materials, there can be obtained such processing function of service water as deodorization, cleaning, removal of bacteria, softening of water, etc.

The service water processing device (water purifying apparatus) of the type mentioned above is required to be periodically exchanged in order to maintain its processing performance in a high level for a long time. As a water purifying apparatus which can be easily exchanged, there are known, among others, ones in which the processing material itself is contained in a cartridge (Japanese Patent Early Laid-open Publication No. Sho 59-76514, Japanese Patent Early Laid-open Publication No. Sho 60-190206, Japanese Utility Model Early Laid-open Publication No. Sho 49-127053, Japanese Utility Model Early Laid-open Publication No. Sho 55-167412, Japanese Utility Model Publication No. Sho 57-60880, etc.).

One known example of the above-mentioned purifying apparatus is a cock mount type purifying apparatus in which the apparatus body itself is directly mounted on a cock (service water pipe) through an arm-like water inlet member adapted to introduce a raw water into the apparatus from a water service supply.

Such generally used water purifying apparatus is, in some cases, mounted on a cock which can supply both cool and hot water.

However, since the cock is usually located at an upper position of a sink (a basin or receptacle in a kitchen, connected with a water supply and a drainpipe), an upper space, particularly a generally central portion at that, is occupied by the body of the water purifying apparatus. This is inconvenient, indeed, for housewives, etc. who are usually required to do such daily work as washing plates, dishes, cups, knives and forks, etc. in the sink.

Further, since there is no consideration given to the conventional water purifying apparatus for preventing the inflow of a hot water, it involves such problems as that a hot water flows into the body of the water purifying apparatus when a hot water cock is opened by mistake and as a result, residual chlorines, micro-organics, hardness components, etc. contained in a service water which were once attracted to an activated carbon, for example, is removed therefrom and eluted to the purified water side with the result that the purified water presents unfavorable smell and taste. At the same time, it causes deterioration of separation- and filtration membranes such as hollow fiber filtration membranes. This gives rise to another problem that the time required for exchanging the water purifying cartridge is shortened.

In order to solve the above-mentioned problems, an improved water purifying cartridge is demanded.

It is therefore a first object of the present invention to provide an improved water purifying cartridge, i.e., a water purifying cartridge which is compact, excellent in water purifying ability and easy to be exchanged.

A second object of the present invention is to provide a cock mount type water purifying apparatus which does not become an obstacle when daily work is carried out in the sink and which also makes it possible to use for the original purpose of providing service water.

A third object of the present invention is to provide a water purifying apparatus which is capable of preventing hot water from flowing into the body thereof even if it occurs such an incident as that a hot water is introduced into the water purifying apparatus by mistake.

DISCLOSURE OF THE INVENTION

The present invention has achieved the first object by providing a water purifying cartridge which will be described next.

A water purifying cartridge characterized in that it includes a double structure container having an outer container and an inner cylinder disposed within the outer container, an inlet port through which water flows into an external space defined by the outer container and the inner cylinder, and an outlet port through which water flows out of an internal space located at an inner side of the inner cylinder, the external and internal spaces being communicated with each other through a water channel formed in the inner cylinder and separated through a filter, the external space being filled with activated carbon and the internal space being loaded with separation- and filtration membranes, water flowed into the external space through the inlet port being arranged to pass through the activated carbon, then introduced into the internal space through the water channel, then purified during the passage through the separation- and filtration membranes, and then discharged through the outlet port.

Further, the present invention has achieved the second object by providing a water purifying apparatus which will be described next.

A water purifying apparatus comprising a block base having a raw water supplying portion and a purified water discharging portion, and a water purifying cartridge removably mounted on the block base, the water purifying apparatus being characterized in that the block base is connected with an arm-like water inlet member having a service water pipe connector portion, the raw water supplying portion being provided with a passage adapted to supply a service water to the original water supplying portion and a raw water outlet portion, both the passage and the raw water outlet portion being communicated with the service water pipe connector portion, the stream being switchable toward selected one of them by a switch valve.

Further, the present invention has achieved the third object by providing a water purifying apparatus which will be described next.

A water purifying apparatus characterized in that a block base having a raw water supplying portion and a purified water outlet portion is provided with a water purifying cartridge removably mounted thereon and with a hot water prevention mechanism for preventing the inflow of hot water into the water purifying cartridge.

BRIEF DESCRIPTION OF THE DRAWINGS

FIG. 8 is a sectional view, corresponding to FIG. 1, showing the outlet of a water purifying apparatus according to a partly modified embodiment of the present invention.

BEST MODE FOR PRACTICING THE INVENTION

One embodiment of the present invention will be described in detail with reference to the drawings.

Figure 1:
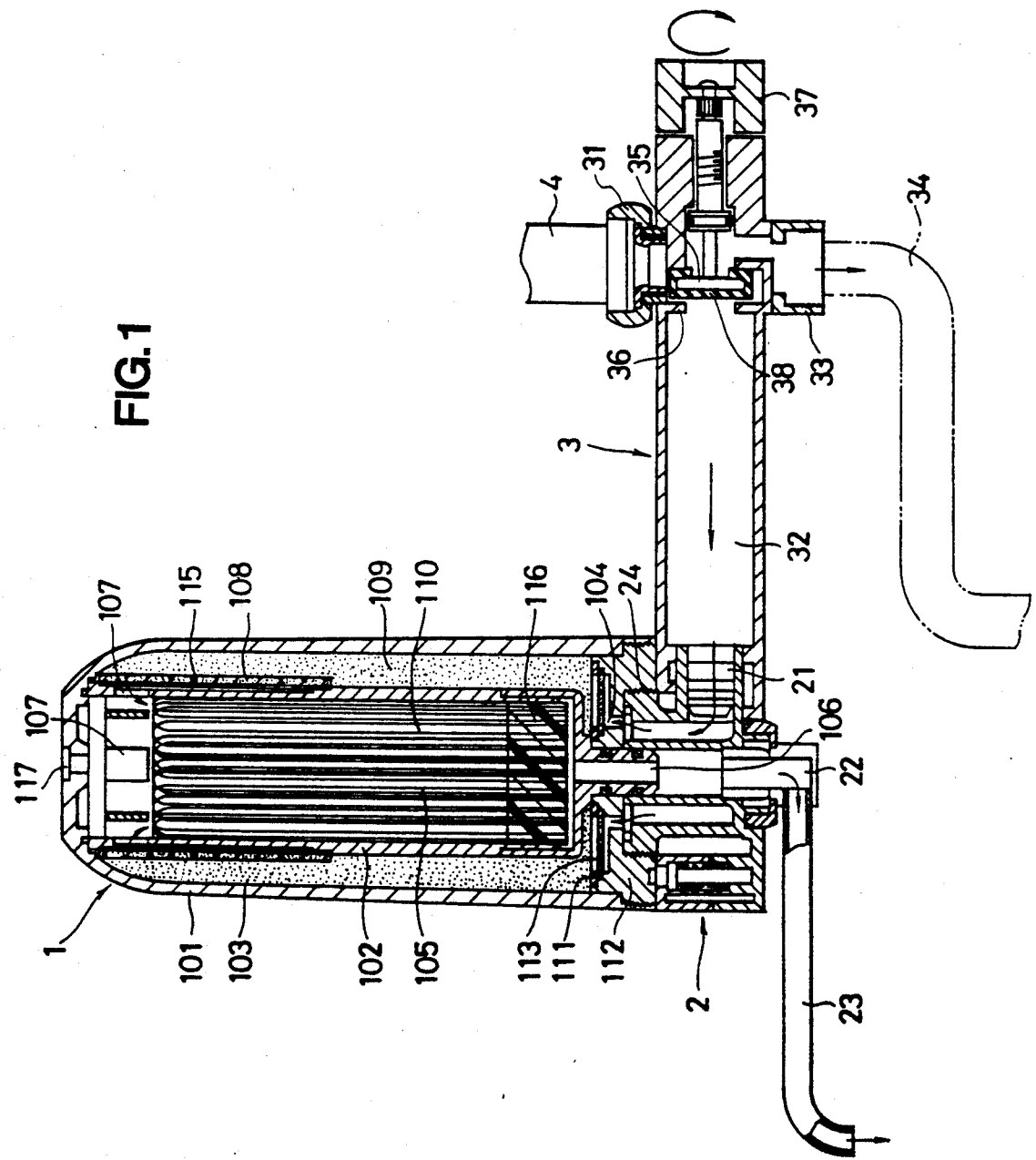
FIG. 1 is a sectional view showing the outline of one embodiment of the present invention in which a water purifying cartridge according to one embodiment of the present invention is used.
Figure 4:
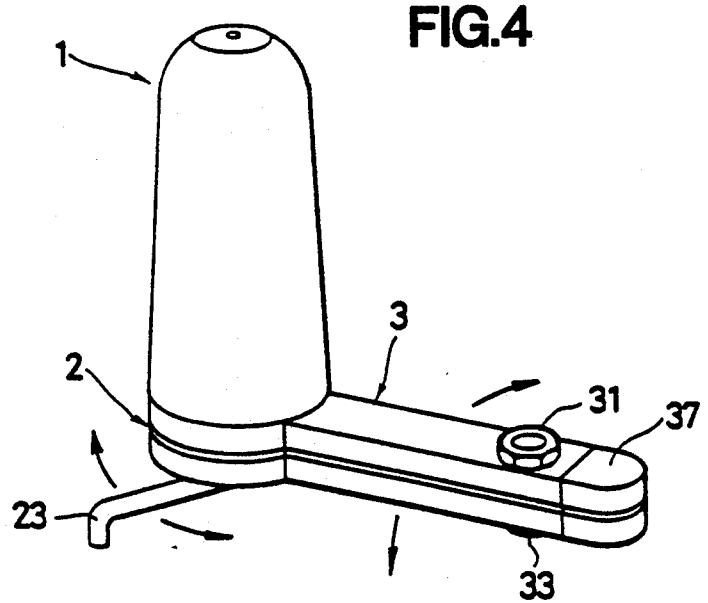
FIG. 4 is a perspective view showing the outline of the water purifying apparatus.

FIG. 1 is a sectional view showing the outline of a water purifying apparatus according to one embodiment of the present invention. The water purifying apparatus according to this embodiment is a cock mount type water purifying apparatus in which the body thereof is comprised of a water purifying cartridge 1 and a block base 2 mounted thereon, the block base 2 being connected with an arm-like water inlet member 3 and also with a cock (service water pipe) 4 at a service water pipe connector portion 31 disposed in the vicinity of one end portion of the water inlet member 3. This connection can be realized by means of direct screw engagement using, for example, a cock joint comprising a union joint, etc. FIG. 4 is a perspective view showing the water purifying apparatus in a way more easily understood.

First, the water inlet member will be described.

The water inlet member 3 is formed of a cylindrical body having a passage 32 formed therein and adapted to supply raw water to the body of the water purifying apparatus. The water inlet member 3 is provided at an upper portion in the vicinity of one end thereof with the service water pipe connector portion 31 with which the cock is connected by means of screw engagement as described above.

Further, the water inlet portion 3 is provided with a raw water outlet portion 33 at a lower portion thereof and under the service water pipe connector portion 31, so that the stream from the service water pipe can be switched either to the direction of the passage 32 or to the direction of the raw water outlet portion 33 by a switch valve disposed therebetween. The raw water outlet portion 33 is preferably connected with a discharge pipe 34 in the manner as shown by an imaginary line.

The switch valve includes a valve body 35 and a valve seat 36, and a gap formed between the valve body 35 and the valve seat 36 can be adjusted by rotating a handle 37 mounted on one edge thereof. The valve body 35 is crowned with a rubber member 38.

Next, the water purifying cartridge 1 and the block base 2, which constitute the body of the water purifying apparatus of this embodiment will be described in detail. The water purifying cartridge 1 is removably mounted on the block base 2.

The water purifying cartridge 1 has a double structure container portion comprising a cylindrical outer container 101 and a circular cylinder 102 concentrically arranged within the container 101 in section, an upper end of the inner cylinder 102 being intimately engaged with the outer container 101 by O-ring, heat sealing, or the like. Further, the water purifying apparatus has an inlet port 104 through which water flows into an external space 103 defined by the outer container 101 and the inner cylinder 102, and an outlet port 106 through which water flows out of an internal space 105 defined within the inner cylinder 102.

The external space 103 and the internal space 105 are communicated with each other through water channels 107 formed at four places of the inner cylinder 102 so that water can flow into the internal space 105. At the same time, the spaces 103 and 105 are separated through a second filter 108, so that the adjacent activated carbon 109 does not enter into the internal space 105. The external space 103 is filled with the activated carbon 109, and the internal space 105 is loaded with separation- and filtration membranes 110, to thereby constitute the water purifying cartridge 1 in this embodiment.

Further, formed on the block base 2 are a raw water supplying portion 21 for supplying a raw water into the inlet port 104, and a purified water outlet portion 22 for discharging a purified water coming from the outlet port 106. The raw water supplying portion 21 is connected with the water inlet member 3 in such a way that one end of the member 3 is engaged with the former. The purified water outlet portion 22 is intimately engaged with the outlet port 106 through an O-ring wound around the outlet port, and the purified water outlet portion 22 is rotatably connected with a Z-shaped discharge pipe 23.

Next, operation of this embodiment will be described. In the drawings, the flow of water is indicated by arrows.

The flow of raw water (service water) is switched toward the passage 32 side, i.e., the body side of the water purifying apparatus by opening the water plug and rotating the handle 37. As a result, raw water can be sent to the raw water supplying portion 21. Thereafter, the water, which has been flowed into the external space 103 from the raw water supplying portion 21 via the inlet port 104, passes through the activated carbon 109, then it is introduced into the internal space 105 via the water channels 107, purified during the passage through the separation- and filtration membranes 110, and discharged from the purified water outlet portion 22 via the outlet port 106. As a result, the raw water is thoroughly purified, and such purified water can be taken off the discharge pipe 23 so as to be used for drinking, etc.

In this way, after the finish of using the purifying apparatus, the handle 37 is rotated in the reverse direction in order to switch the stream toward the raw water outlet portion 33 side, and the water inlet member 3 is rotated to, for example, one corner of a sink where it does not disturb the use of the sink. By this, the large space of the sink can be obtained and it can also readily be used as a normal service water supply.

Subsequently, the water purifying apparatus of this embodiment will be described in more detail.

In the water purifying cartridge, a first filter 113 clamped between and fixed by a filter guard 111 located in an upper position and a mount seat 112 located in a lower position, is vertically attached to a lower end of the external space 103 relative to the center axis of the inner cylinder 102, so that it fulfills its role for preventing foreign matters such as iron rust, etc. from entering into the external space 103 and for confining the activated carbon 109 in the external space 103.

Figure 2:
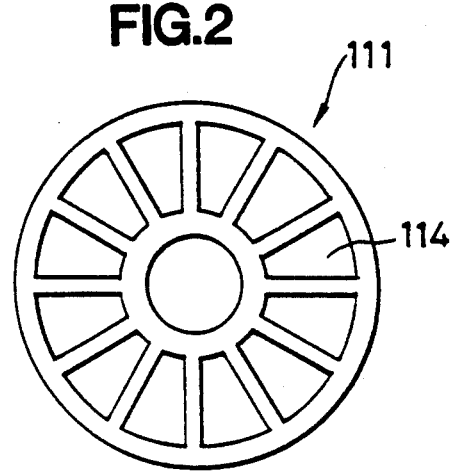
FIG. 2 is a plan view showing a filter guard used in the water purifying apparatus.
Figure 3:
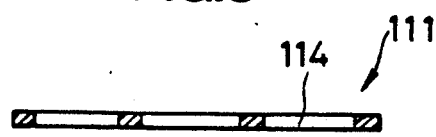
FIG. 3 is a sectional view of the filter guard of FIG. 2.

The filter guard 111 is a member having a plan structure shown in FIG. 2 and having a sectional structure shown in FIG. 3. The filter guard 111 is provided with hole portions 114 equally arranged in an inner periphery thereof and adapted to guide a raw water entered therein from the inlet portion 104 formed on the mount seat 112 to the first filter 113.

The second filter 108 is disposed over a wide range exceeding the area where the water channels 107 are formed and wound on the entirety of the outer periphery of the inner cylinder 102. The outer peripheral wall of the inner cylinder 102 on which the second filter 108 is wound, is formed in such a manner as to be lower than the adhered outer peripheral surface portion by one step, and a water pocket 115 comprising a narrow gap is formed between the outer peripheral wall and the inner surface of the second filter 108. As a result, the filtration area of the second filter 108 can be increased and its processing performance is enhanced.

The first and second filters 113 and 108 are preferably formed of a porous material having a pore size of 0.5 to $5\mu$, for example. Concretely, filters formed of a nonwoven material composed of a synthetic high polymer compound such as, polyolefin, polyester, polyvinylalcohol, etc., cotton and cellulose are used.

The activated carbon 109, which is filled in the above-mentioned outer space 103, acts to remove substance having unfavorable smell or taste such as residual chlorines, trace of organic compounds, hardness components, etc. contained in a raw water (concretely, ion such as sodium, calcium, magnesium, iron, etc. Water containing a large quantity of such ion is not tasty). The average grain size of the activated carbon used in the present invention is preferably 5 to 100 meshes, and more preferably 8 to 60 meshes. For the purpose mentioned above, the material filled in the outer space 103 is not necessarily limited to activated carbon, but an attractive material such as ion exchange resins, chelate resins, zeolite, etc. may be jointly used.

The separation- and filtration membranes 110 loaded in the inner space 105 act to remove and purify microfloating substance such as iron colloid, dust, bacteria, etc. by pores formed in the wall portion of the separation- and filtration membranes 110 by permeating the water passed through the activated carbon 109 to transmit through the separation- and filtration membranes 110.

The separation- and filtration membranes 110 in this embodiment are comprised of a hollow fiber bundle which is formed of a bundle of a plurality of porous hollow fiber filtration membranes. The hollow fiber bundle are designed such that both ends of the porous hollow fiber filtration membranes are bent in such a manner as to form a U-shaped loop at an upper portion thereof. They are bundled and fixed by a tubular plate 116 formed of resin located at a lower end portion thereof and both ends of the porous hollow fiber filtration membranes are opened at a lower surface portion of the tubular plate 116. However, the hollow fiber bundle is not limited to the one in which the porous hollow fiber filtration membranes are bent at upper end portions thereof in a U-shape as mentioned above, but it may be of such construction so that the upper portion is hardened with resin and sealed.

The porous hollow fiber filtration membranes to be applied to the hollow fiber bundle are preferably 30 to $200\mu$ in membrane thickness and more preferably 30 to $150\mu$. Further, the average pore size of the pores, when measured by a mercury porosimeter, is preferably 0.05 to $5\mu$ and more preferably 0.1 to $2\mu$. In addition, the vacancy percentage is preferably 20 to 90 volume % and more preferably 50 to 80 volume %. Concretely, there can be listed porous hollow fiber filtration membranes such as polyolefin series, polysulfine series, polyvinylalcohol series, cellulose series, poly methyl methacrylate series. The separation-and filtration membranes loaded in the inner cylinder 102 are not limited to the porous hollow fiber filtration membranes, and it goes without saying that porous flat membranes, etc. may be used.

Also, in this embodiment, both of the inlet port 104 and the outlet port 106 are located in the vicinity of a lower end of the water purifying cartridge, while the water channels 107 are located in the vicinity of an upper end of the water purifying cartridge 1. Accordingly, although the water purifying cartridge 1 is formed in a compact parallel structure comprising a double structure located on a concentric circle in its section, the activated carbon 109 and the separation- and filtration membranes 110 are arranged in series relative to the stream. In addition, both of them have a long passage length and can be fully contacted with water. Therefore, the purifying performance which both the activated carbon 109 and the separation- and filtration membranes 110 originally have, can be fully exhibited.

The water purifying cartridge 1 is removably engaged with a threadedly engaging portion 24 formed on an upper end portion thereof and can easily be exchanged by rotating the water purifying cartridge 1. However, the method for attaching the water purifying cartridge 1 is not limited to the thread engagement.

Further, the water purifying cartridge 1 is provided at a wall surface of its upper portion with an air-extracting mechanism 117 communicating with the inner space 105. This air-extracting mechanism 117 is adapted to rapidly and easily discharge air in the water purifying cartridge 1 when the raw water is introduced to the raw water processing portion constituted by the activated carbon 109, etc. from the inlet port 104. An actual air-extraction may be performed by various methods, such as attaching hydrophobic membranes which permit air to transmit therethrough but prohibit raw water to transmit therethrough to an air-extracting mouth of the air-extracting mechanism 117, or opening the air-extracting mouth by contacting a screw or opening the air-extracting mouth by pushing with a hand.

The various members constituting the water purifying apparatus, excepting the activated carbon 109 and the separation- and filtration membranes 110, are not particularly limited. For example, they are preferably made from metal such as stainless steel, copper, aluminum, etc. or alloy thereof, or plastics such as ABS resin, polycarbonate resin, etc.

Figure 5:
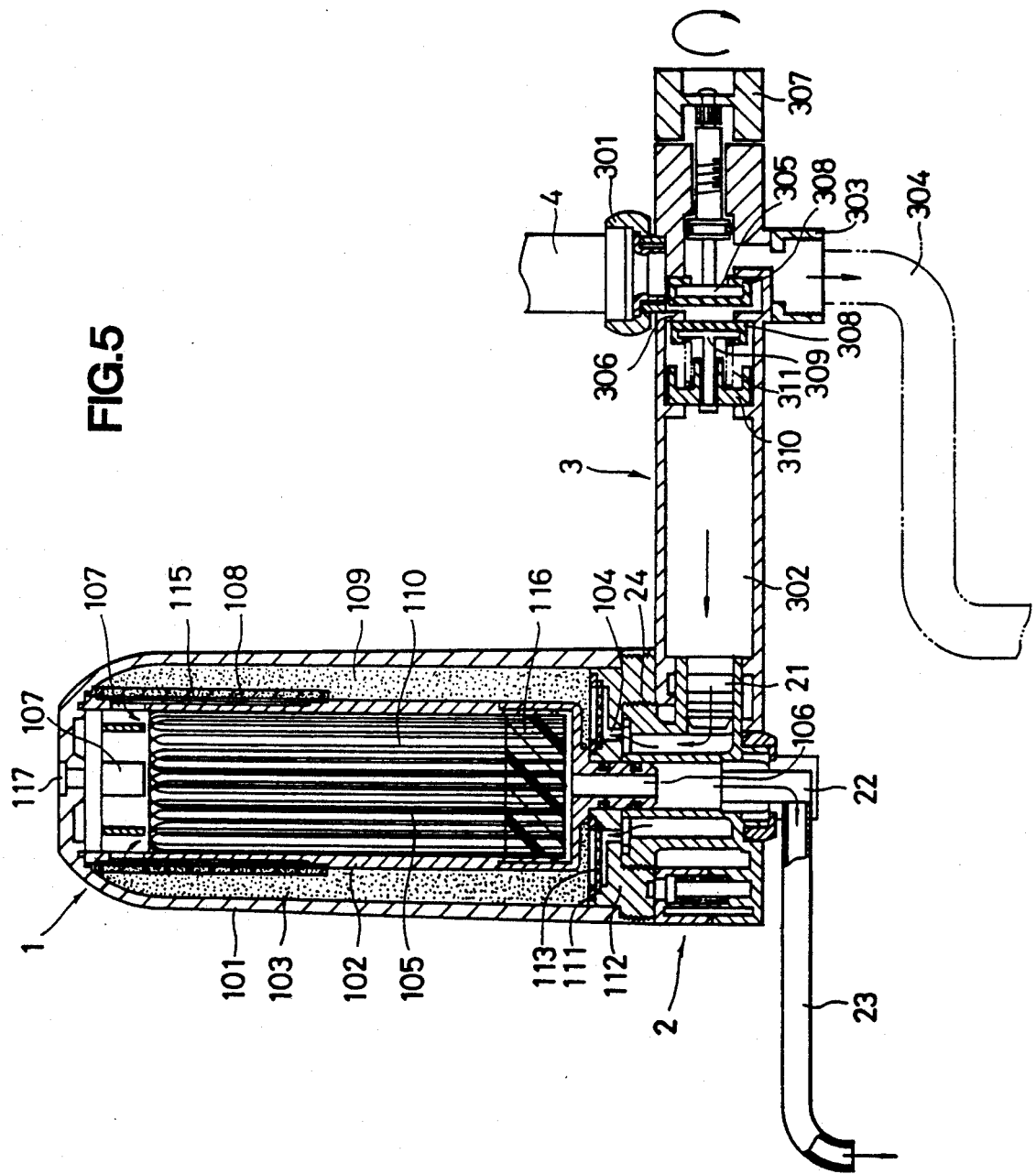
FIG. 5 is a sectional view, corresponding to FIG. 1, showing the outlet of a water purifying apparatus according to another embodiment of the present invention.
Figure 6:
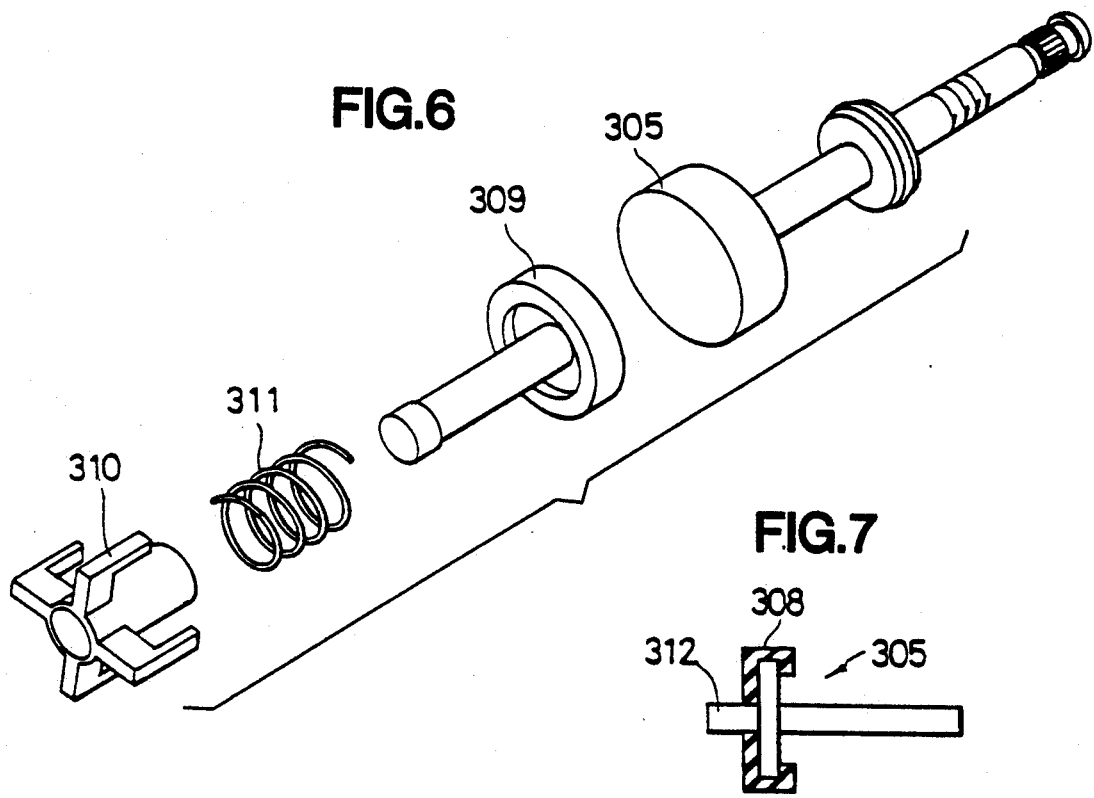
FIG. 6 is an exploded perspective view for explaining a hot water prevention mechanism which is applied to the water purifying apparatus.

FIG. 5 is a sectional view showing the outline of another embodiment of the present invention. This embodiment is constructed in the same way as the embodiment shown in FIG. 1 except that the hot water prevention mechanism for preventing a hot water from entering into the water purifying cartridge is disposed within the water inlet member 3. Accordingly, with respect to the embodiment shown in FIG. 5, there will be described only the structure, operation and effect of the hot water prevention mechanism. In FIGS. 5 and 6, the reference numerals 301 to 308 denote identical members (portions) which are denoted by the reference numerals 31 to 38, respectively.

The hot water prevention mechanism in the embodiment shown in FIG. 5 is disposed on the body side of the water purifying apparatus in such a manner as to be adjacent to a switch valve including a valve body 305 and a valve seat 306, as in the switch valve of the embodiment shown in FIG. 1. This hot water prevention mechanism includes a hot water preventing valve body 309 disposed in the opposite direction to the valve body 305, a supporting member 310 having a central hole through which a valve shaft thereof penetrates and four claw portions arranged therearound, and a coil-like shape memory alloy 311 disposed between the supporting member 310 and the hot water preventing valve body 309 and wound on the valve shaft. Further, the hot water preventing valve body 309 is crowned with a rubber member 308.

In order to facilitate an easier understanding of the structures of the switch valve and the hot water prevention mechanism, the exploded perspective view of FIG. 6 shows members located within the water inlet member 3 and constituting the switch valve and hot water prevention mechanism.

Next, operation of the embodiment shown in FIGS. 5 and 6 will be described. In FIGS. 5 and 6, the flow of water is indicated by arrows.

By opening the water supply plug and rotating a handle 307 for switching the flow of raw water (service water) to a passage 302 side, i.e., body side of the water purifying apparatus, raw water can be sent to the raw water supplying portion 21. It goes without saying that a gap is formed between the hot water preventing valve body 309 and the valve seat 306 at that time. The flow of water after that time is the same as in the embodiment shown in FIG. 1.

In the event a hot water flows into the water inlet member 3 by mistake when the water purifying apparatus is used in the manner as mentioned above, the hot water preventing valve body 309 is driven in the right-hand direction in the drawings by the shape memory alloy 311 as soon as the hot water contacts the alloy 311. As a result, since the gap between the hot water preventing valve body 309 and the valve seat 306 is blocked, further inflow of the hot water is prevented. Accordingly, the hot water is effectively prevented from flowing into the body of the water purifying apparatus. FIG. 5 shows a state after the hot water prevention mechanism has been activated.

Figure 7:
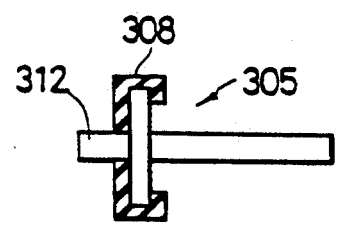
FIG. 7 is a sectional view showing another hot water preventing valve body.

In order to restore the original usable state after the hot water prevention mechanism has been activated as mentioned above, a gap is formed again between the hot water preventing valve body 309 and the valve seat 306 after the hot water is cooled. However, it is not limited to this method. It is also possible to employ such a method as that one having a projecting portion 312 as shown in FIG. 7 is used as the valve body 305 of the switch valve, and the valve body 305 is pushed in, so that the hot water preventing valve body 309 is forced backward by the projecting portion 312 in order to form a gap between the hot water preventing valve body 309 and the valve seat 306.

Further, a careful consideration should be given so that a hot water higher than 60° C. does not flow into the water purifying cartridge 1. The mechanism for preventing the inflow of a hot water is actuated when the temperature of a raw water flowed into this mechanism is raised to about 40° C. and completely stops activation when the temperature of the raw water flowed into this mechanism reaches 60° C.

In the embodiment of FIG. 5, other constitutions and operations than those described above are the same as in the embodiment shown in FIG. 1.

The hot water prevention mechanism in this embodiment also acts as a check valve when a low temperature water is used. That is, in case a low temperature water flows into the mechanism, since the proof stress of the shape memory alloy is weak, the shape memory alloy, when in use, is pushed back by the hydraulic pressure of the low temperature water flowed therein. However, when the pressure is reduced on the service water pipe side, the hot water preventing valve body 309 is urged toward the valve seat 306 and the gap formed therebetween is blocked therewith. In this sense, the hot water prevention mechanism also acts as a check valve.

Although the present invention has been described in detail with reference to several embodiments, it goes without saying that a water purifying apparatus of the present invention is not limited to the embodiments exemplified above.

For example, the water inlet member can be changed in various ways as long as it is an arm-like cylindrical body including an optional stream switching means.

A check valve adapted to prevent water from flowing back from the water purifying cartridge may be provided in a proper position, for instance, the raw water supplying portion of the block base.

The concrete structure of the block base can be changed in many ways as long as it includes a raw water supplying portion for flowing a raw water into the inlet port of the water purifying cartridge, and a purified water outlet portion adapted to discharge a purified water coming from the outlet port of the water purifying cartridge. Also, it goes without saying that the configuration of the discharge pipe connected with the purified water outlet portion can be changed.

Further, the hot water prevention mechanism is not necessarily limited to the hot water prevention mechanism including, for example, a coil-like member formed of a shape memory alloy, but it may be of a structure using a bimetal, an oil element, etc. However, when such factors as compactness and handiness of the water purifying apparatus are taken into consideration, the use of the hot water preventing valve body is more preferable than the use of the mechanism using a bimetal, an oil element, etc. Similarly, the installing position of the hot water prevention mechanism is not particularly limited to that of the embodiment but it may be within the block base as long as it is a position able to substantially prevent the inflow of a hot water into the purified water cartridge.

Figure 9:
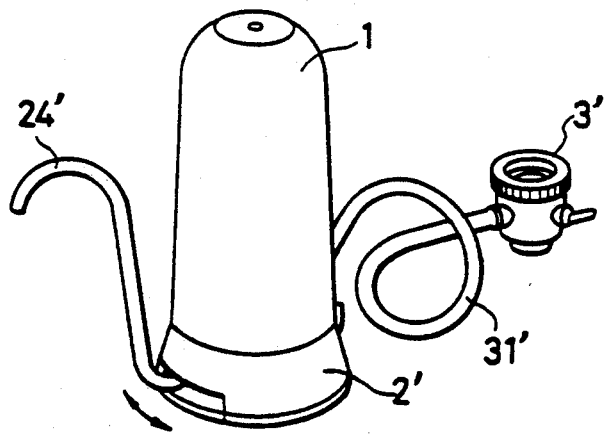
FIG. 9 is a perspective view showing the outline of a water purifying apparatus shown in FIG. 8.

Further, although a cock mount type water purifying apparatus has been exemplified above, it goes without saying that the present invention may be applied to a floor type water purifying apparatus which is connected with a cock through a hose as shown in FIGS. 8 and 9.

The different part of the floor type water purifying apparatus shown in FIGS. 8 and 9 from that of the embodiment shown in FIGS. 1 and 5 will be described briefly. In FIGS. 8 and 9, all the reference numerals excepting those attached with ' denote identical members (portions) as denoted by the respective reference numerals in FIG. 1.

FIG. 8 is a sectional view showing the outline of a floor type water purifying device as one example of a partly modified embodiment of the present invention, and FIG. 9 is a perspective view showing the water purifying device in a way more easy to understand, in which the block base 2' is of a floor type, the raw water supplying portion 21' being connected with one end of a hose 31' the other end of which is connected with a connector member 3' served to be connected with the water cock 4 and provided with a check valve 23' for preventing the back flow of water toward the hose 31' side from the water purifying device. Further, the purified water outlet portion 22 is intimately engaged with the outlet port 106 through an O-ring wound on the periphery of the outlet port, and the purified water outlet portion 22 is rotatably connected with an S-shaped discharge pipe 24'. The connector member 3' attached to the hose 31' is provided with a switch lever 2' adapted to switch the flow of the raw water toward , selected one of the hose 31' side and the downward direction (see arrows) in the drawings.

POSSIBILITY OF INDUSTRIAL UTILIZATION

A water purifying cartridge of the present invention is compact, excellent in water purifying performance and easy to exchange.

Further, the water purifying apparatus of the present invention is of a cock mount type, it can be used in a desired position in the sink, and can be moved toward a corner, etc. of a sink where it does not disturb the washing work, etc. when the apparatus is not in use, so that it can be used for providing a normal service water supply.

Furthermore, since the water purifying apparatus of the present invention including a hot water prevention mechanism can prevent the inflow of a hot water into the body thereof, even if it occurs such an incident as that a hot water is introduced into the water purifying apparatus, there can be normally obtained a purified water, and deterioration of the processing material and an occurrence of trouble, etc. caused by hot water can be prevented beforehand.

We claim:

1. A water purifying cartridge comprising a double structure container having an outer container and an inner cylinder disposed within said outer container, an inlet port through which water flows into an external space defined by said outer container and said inner cylinder, and an outlet port through which water flows out of an internal space located at an inner side of said inner cylinder, said external and internal spaces being in communication with each other via a water channel formed in said inner cylinder and separated through a filter, said filter being wound on an outer peripheral wall of said inner cylinder, said outer peripheral wall being provided with a water pocket, said water pocket comprising a narrow gap formed between said outer peripheral wall and an inner surface of said filter, said external space being filled with activated carbon and said internal space being loaded with separation and filtration membranes, whereby water flowed into said external space through said inlet port passes through said activated carbon, then via said water channel into said internal space wherein it is purified by said separation and filtration membranes, and then discharged through said outlet port.

2. A water purifying apparatus comprising a block base having a raw water supplying portion and a purified water outlet portion, a water purifying cartridge removably mounted on said block base, and a hot water prevention means mechanism for automatically preventing the inflow of hot water having a temperature higher than 60° C. into said water purifying cartridge, said hot water prevention means being located in a raw water supplying passage to said block base.

3. A water purifying apparatus as claimed in claim 2, wherein said hot water prevention means is disposed to an arm-like water inlet member connected with said block base at said raw water pipe supplying portion and having a service water pipe connector portion, said water inlet member including a passage for supplying service water to said raw water supplying portion and a raw water outlet portion, said passage and raw water outlet portion being in communication with said service water pipe connector portion, a switch valve disposed between said passage and said service water pipe connector for directing a stream from the service water pipe connector to either said passage or to said raw water outlet portion.

4. A water purifying apparatus as claimed in claim 2, wherein said water purifying cartridge includes a double structure container having an outer container and an inner cylinder disposed within said outer container, an inlet port for flowing water into an external space defined by said outer container and said inner cylinder, and an outlet port for discharging water from said internal space formed within said inner cylinder, said external space and said internal space being in communication with each other via a water channel formed in said inner cylinder and separated through a filter, said external space being filled with activated carbon and said internal space being loaded with separation and filtration membranes, whereby water flowed into said external space from said raw water supplying portion via said inlet port passes through said activated carbon, then via said water channel into said internal space wherein it is purified by said separation and filtration membranes, and then discharged from said purified water outlet portion via said outlet port.

5. A water purifying apparatus as claimed in claim 2, wherein said hot water prevention means comprises a valve body and a shape memory alloy for driving said valve body, said shape memory alloy being located downstream from said valve body.

6. A water purifying apparatus as claimed in claim 5, wherein said hot water prevention means is disposed to an arm-like water inlet member connected with said block base at said raw water pipe supplying portion and having a service water pipe connector portion, said water inlet member including a passage for supplying service water to said raw water supplying portion and a raw water outlet portion, said passage and raw water outlet portion being in communication with said service water pipe connector portion, a switch valve disposed between said passage and said service water pipe connector for directing a stream from the service water pipe connector to either said passage or to said raw water outlet portion.

* * * * *